(12) United States Patent
Gruner-Nielsen et al.

(10) Patent No.: US 9,176,275 B2
(45) Date of Patent: Nov. 3, 2015

(54) DISPERSION-COMPENSATING SYSTEM AND DISPERSION-COMPENSATING FIBER WITH IMPROVED FIGURE OF MERIT

(75) Inventors: Lars Gruner-Nielsen, Copenhagen (DK); Dan P Jakobsen, Copenhagen (DK); Kim G Jespersen, Kongens Lyngby (DK)

(73) Assignee: OFS FITEL, LLC, Norcross, GA (US)

( * ) Notice: Subject to any disclaimer, the term of this patent is extended or adjusted under 35 U.S.C. 154(b) by 75 days.

(21) Appl. No.: 13/816,301

(22) PCT Filed: Sep. 6, 2011

(86) PCT No.: PCT/US2011/050574
§ 371 (c)(1),
(2), (4) Date: Feb. 11, 2013

(87) PCT Pub. No.: WO2012/031304
PCT Pub. Date: Mar. 8, 2012

(65) Prior Publication Data
US 2013/0223851 A1    Aug. 29, 2013

Related U.S. Application Data

(60) Provisional application No. 61/379,739, filed on Sep. 3, 2010.

(51) Int. Cl.
G02B 6/036    (2006.01)
G02B 6/02     (2006.01)
H04B 10/2507  (2013.01)

(52) U.S. Cl.
CPC ........ *G02B 6/02261* (2013.01); *G02B 6/02019* (2013.01); *G02B 6/03644* (2013.01); *H04B 10/2507* (2013.01)

(58) Field of Classification Search
None
See application file for complete search history.

(56) References Cited

U.S. PATENT DOCUMENTS

| 6,543,942 B1* | 4/2003 | Veng ............................... 385/95 |
| 7,274,848 B1* | 9/2007 | Mishra et al. .................. 385/127 |
| 2002/0034364 A1 | 3/2002 | Veng |
| 2002/0123851 A1 | 9/2002 | Kurooka et al. |
| 2002/0172483 A1 | 11/2002 | MacChesney et al. |
| 2004/0114887 A1* | 6/2004 | Chandan et al. ................. 385/99 |
| 2005/0036752 A1* | 2/2005 | Burke et al. .................. 385/125 |
| 2006/0188263 A1 | 8/2006 | Islam et al. |
| 2007/0065081 A1 | 3/2007 | Antona et al. |
| 2007/0201791 A1* | 8/2007 | Guan et al. ...................... 385/28 |
| 2009/0274417 A1 | 11/2009 | Ramachandran et al. |
| 2010/0278528 A1 | 11/2010 | Isomura et al. |

* cited by examiner

*Primary Examiner* — Michelle R Connelly
(74) *Attorney, Agent, or Firm* — Jacobs & Kim LLP

(57) ABSTRACT

A dispersion-compensating system and a dispersion-compensating fiber have an improved figure of merit and effective area. The dispersion-compensating system comprises a bulk dispersion-compensating module for providing optical-domain bulk dispersion compensation for an optical signal transmission. Additionally, the system may further comprise residual dispersion compensation, which can be performed in the electrical domain following coherent detection of both amplitude and phase of an optical signal. The dispersion-compensating fiber comprises an up-doped core region; a down-doped trench; an up-doped ring; and an outer cladding, and is configured to have a high figure of merit (FOM).

13 Claims, 9 Drawing Sheets

120

Table: Measured Fiber Properties

| Property | Unit | Value |
|---|---|---|
| Length | m | 2100 |
| Dispersion 1550 nm | ps/(nm·km) | -1275 |
| OTDR attenuation 1550 nm | dB/km | 0.58 |
| Fiber FOM 1550 nm | ps/(nm·dB) | 2200 |
| PMD 1540 nm | ps/km$^{1/2}$ | 2.0 |
| Effective area 1550 nm | μm$^2$ | 90* |

*Simulation

51
Table Exemplary Fiber Region Radii and Index Differences

| Fiber Region | Inner Radius | Outer Radius | $\Delta n$ |
|---|---|---|---|
| Core | – | $r_1 = 4.5\ \mu m$ | $\Delta n_1 = 35 \cdot 10^{-3}$ |
| Trench | $r_1 = 4.5\ \mu m$ | $r_2 = 6.1\ \mu m$ | $\Delta n_2 = -10 \cdot 10^{-3}$ |
| Ring | $r_2 = 6.1\ \mu m$ | $r_3 = 13.0\ \mu m$ | $\Delta n_3 = 4 \cdot 10^{-3}$ |
| Outer Clad | $r_3 = 13.0\ \mu m$ | $r_0 = 62.5\ \mu m$ | $\Delta n_0 = 0$ |

80

Table: Measured Splice Loss

| Splice | | Loss Obtained |
|---|---|---|
| SSMF 71, 77 | Bridge Fiber 72, 76 | 0.25 dB |
| Bridge Fiber 72, 76 | HOM DCF 73, 75 | 0.37 dB |
| HOM DCF 73, 75 | HOM DCF 74 | 0.30 dB |

120

Table: Measured Fiber Properties

| Property | Unit | Value |
|---|---|---|
| Length | m | 2100 |
| Dispersion 1550 nm | ps/(nm·km) | -1275 |
| OTDR attenuation 1550 nm | dB/km | 0.58 |
| Fiber FOM 1550 nm | ps/(nm·dB) | 2200 |
| PMD 1540 nm | ps/km$^{1/2}$ | 2.0 |
| Effective area 1550 nm | μm$^2$ | 90* |

*Simulation

DISPERSION-COMPENSATING SYSTEM AND DISPERSION-COMPENSATING FIBER WITH IMPROVED FIGURE OF MERIT

CROSS REFERENCE TO RELATED APPLICATIONS

The present application claims the priority benefit of the following U.S. provisional patent application, which is owned by the assignee of the present application:
U.S. Prov. Patent App. Ser. No. 61/379,739, filed on Sep. 3, 2010.

BACKGROUND OF THE INVENTION

1. Field of the Invention

The present invention relates generally to optical fiber devices and related methods, and in particular to an improved dispersion-compensating system and a dispersion-compensating fiber with an improved figure of merit and effective area.

2. Background Art

Coherent detection followed by digital signal processing in the electrical domain is currently being investigated as an enabling technology for transmission systems with increased transmission rates. When both optical amplitude and phase are detected, linear impairments such as dispersion and polarization-mode dispersion (PMD) can be fully compensated in the electrical domain. This approach eliminates the need for optical dispersion compensation using dispersion-compensating fibers (DCFs), or like devices.

However, there are known disadvantages of an electrical domain approach to dispersion compensation. One disadvantage is that, when providing compensation for large amounts of dispersion, an electrical domain dispersion-compensating system requires large and expensive digital signal processing integrated circuits (DSPs), as well as high electrical power consumption. Thus, there exists a need for an improved approach for managing dispersion compensation in such systems.

Another issue is the "figure of merit" (FOM), a metric that is commonly used in the fiber optics industry to quantify the amount of loss added to an optical transmission system by a given fiber or fiber module. Generally speaking, the FOM for an optical fiber module is the ratio formed by dividing the numerical value of the dispersion of the optical fiber by the attenuation of that fiber at a particular wavelength. A high figure of merit signifies that a dispersion-compensating fiber module add less loss to the system.

Further, an optical transmission fiber with a large dispersion typically has a large effective area, $A_{eff}$. The effective area $A_{eff}$ is inversely proportional to FOM. Thus, optical fibers with large effective areas tend to have low FOMs.

Thus, an ongoing challenge for fiber designers is the balancing of the effective area needed to achieve a given dispersion characteristic against the need for a sufficiently high FOM. Prior designs have provided fibers that display the following values for FOM and $A_{eff}$:

FOM=460 ps/(nm·dB); $A_{eff}$=21 µm²: M. Wandel et al., *Proceedings of ECOC '2001*, PD.A.1.4, and U.S. Pat. No. 6,490,398;

FOM=450 ps/(nm·dB); $A_{eff}$=17 µm²: M. Hirano et al., *Proceedings of OFC/NFOEC '2009*, OWN5; and FOM=477 ps/(nm·dB); $A_{eff}$=70 µm²: S. Ramachandran, *Journal of LightWave Technology*, pp 3425, 2005.

SUMMARY OF THE INVENTION

These and other issues are addressed by the present invention, aspects of which are directed to a dispersion-compensating system and a dispersion-compensating fiber with an improved figure of merit and effective area.

According to an aspect of the invention, a dispersion-compensating system comprises a bulk dispersion-compensating module for providing optical-domain bulk dispersion compensation for an optical signal transmission. As used herein, "bulk dispersion" is defined as a majority of the total dispersion (wavelength and material) of a system, that is, at least 50 percent or greater. The system may further comprise residual dispersion compensation, preferably occurring in the electrical domain following coherent detection of both amplitude and phase of an optical signal.

According to a further aspect of the invention, a dispersion-compensating fiber comprises an up-doped core region; a down-doped trench; an up-doped ring; and an outer cladding. The dispersion-compensating fiber is configured to have a high figure of merit, wherein the figure of merit (FOM) is defined by the equation:

$$FOM = -\frac{D_{DCF}}{\alpha_{DCF}},$$

wherein $D_{DCF}$ is the dispersion coefficient, and $\alpha_{DCF}$ is the attenuation coefficient of the dispersion-compensating fiber.

BRIEF DESCRIPTION OF THE DRAWINGS

FIG. 12 shows a table setting forth a summary of measurements taken from the module.

DETAILED DESCRIPTION

Aspects of the present invention are directed to a dispersion-compensating module (DCM) for use in a coherent detection transmission system, and to a dispersion-compensating fiber (DCF) suitable for use in the described dispersion-compensating module.

A DCM with close to a factor 5 improvement in FOM compared to other known modules is depicted utilizing an inventive DCF having a factor of 4.5 increase in effective area compared to other single mode high FOM DCF. Specifically, the enabling technology includes a few-moded fiber working in the $LP_{02}$ or higher mode. Fibers supporting multiple mode often are associated with noise created through multi path interference (MPI) due to different propagation constants of the individual modes However, even though the inventive fiber is not a single mode and mode converters may be necessary in the module system, a low MPI of −37 dB was obtained.

Using the inventive fiber, it is possible to make a DCF module, which compensates 1000 km of standard single mode fiber (total dispersion of 17000 ps/nm) with an insertion loss of less than 10 dB. Additionally, it is possible to launch approximately 6.5 dB of higher power into the DCF module compared to a module using a conventional single mode DCF module due to the increased effective area.

Although the inventive DCF module does not provide dispersion slope compensation and has a higher PMD compared to a conventional single-mode DCF module, this is not a problem for application in systems with coherent detection and digital signal processing.

Figure 1:
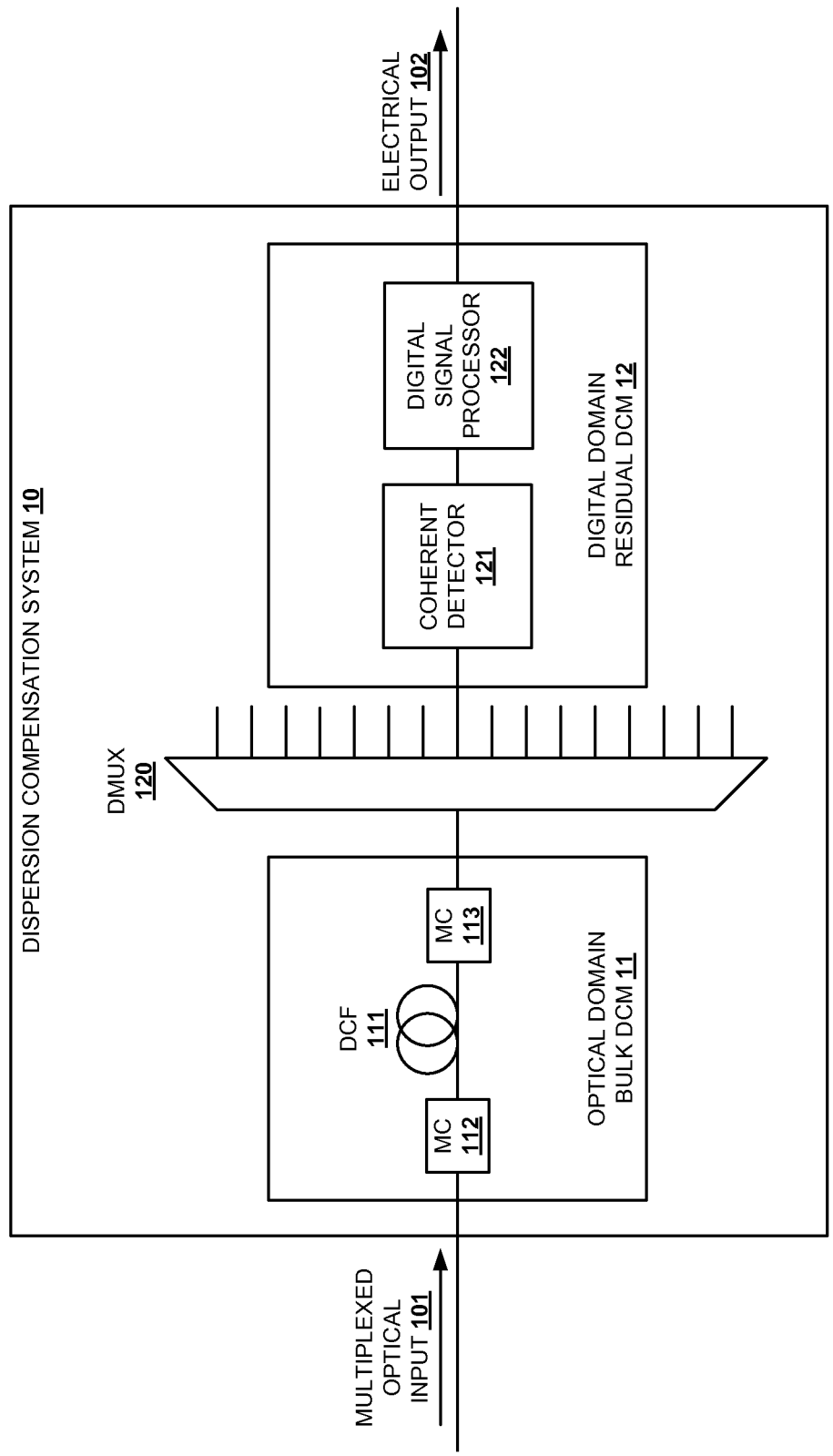
FIG. 1 shows a general diagram of a dispersion-compensating system according to an aspect of the invention.

The present description is organized into the following sections:
1. Overview
2. Theoretical Framework
3. Exemplary Dispersion-Compensating Fiber
4. Exemplary Bulk Dispersion-Compensating Module
5. Conclusion 1. Overview FIG. 1 shows a general diagram of an exemplary dispersion-compensating system 10 according to an aspect of the invention. System 10 receives an optical transmission signal as an input 101, and provides a dispersion-compensated electrical transmission signal as an output 102.

Input 101 is connected to bulk dispersion-compensating module (DCM) 11, which is configured to provide bulk dispersion compensation in the optical domain. Bulk DCM 11 comprises a length of a dispersion-compensating fiber (DCF) 111 according to an aspect of the invention, described below. According to a practice of the invention, DCF 111 is configured for operation in a higher-order mode. In another practice of the invention, DCF 111 is configured for single-mode operation, i.e., in the $LP_{01}$ mode. In the example shown in FIG. 1, DCF 11 is configured for operation in the $LP_{02}$ mode.

Bulk DCM 11 includes first and second mode converters 112 and 113 to provide coupling into and out of the higher-order mode of DCF 111. As discussed below, according to an aspect of the invention, bridge fibers can optionally be used to reduce splice loss resulting from the different modefield diameters of the various components of bulk DCM 11.

Bulk DCM 11 is disposed after any demultiplexing of individual wavelength division multiplexing (WDM) channels by demultiplexer 120. Bulk DCM 111 can be connected to residual DCM 12, which is configured to provide compensation, in the electrical domain, for residual dispersion only. Residual DCM 12 comprises a coherent detector 121 and a dispersion-compensating digital signal processor (DSP) 122. Coherent detector 121 detects the full electric field of the optical signal transmission, which contains both amplitude and phase information. DSP 122 is programmed to perform any necessary residual dispersion compensation, including PMD compensation.

It will be appreciated that, because bulk DCM 11 has already provided bulk dispersion compensation for the optical signal, significantly fewer computations are required from the DSP, compared with a system in which dispersion compensation is provided only in the electrical domain. Consequently, the DSP can be much smaller in size and in the number of components, as compared to when all the dispersion compensation is done in the electrical domain, thereby significantly reducing power consumption.

Figure 2:
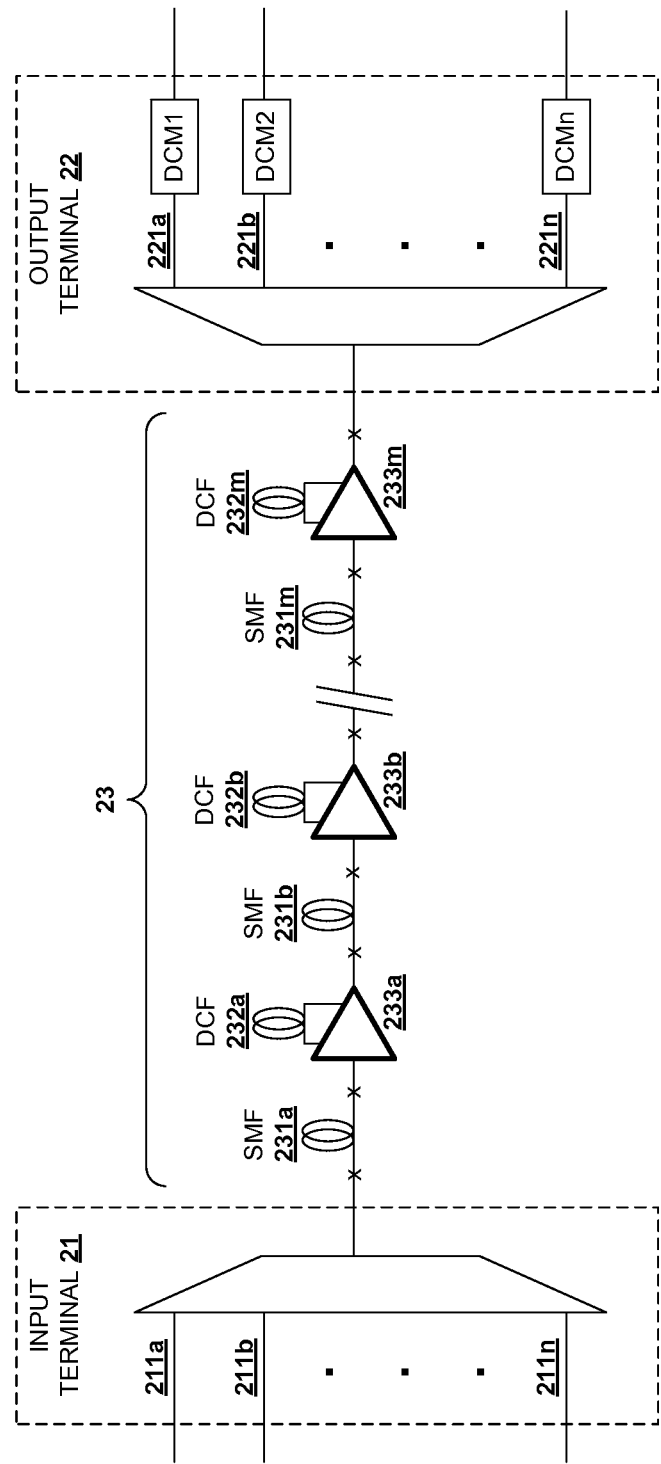
FIG. 2 is a diagram of a transmission system according to the prior art.
Figure 3:
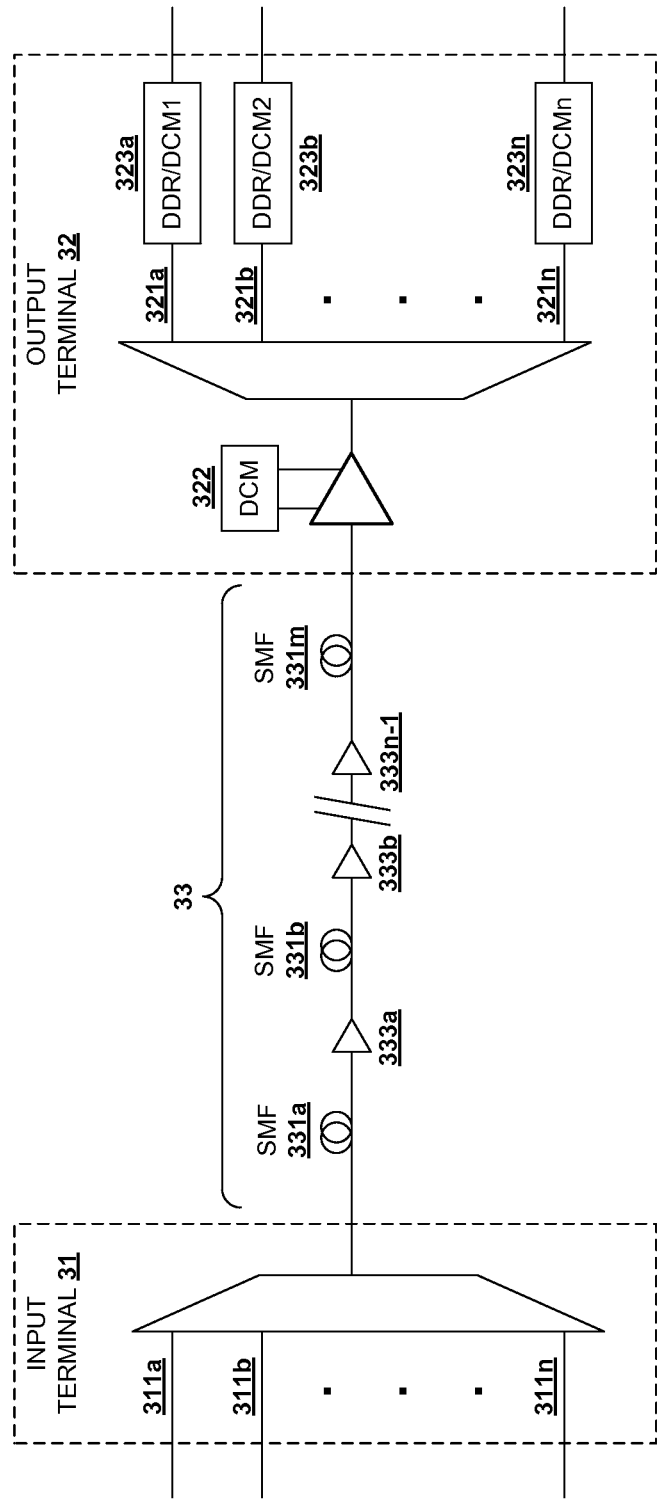
FIG. 3 is a diagram of a transmission system according to an exemplary practice of the present invention.

According to a further aspect of the invention, illustrated in FIGS. 2 and 3, a DCF is used having a figure of merit (FOM) that is sufficiently high such that, although the DCF compensates the bulk part of the dispersion of the transmission system, the insertion loss of the DCF is still low enough to be compensated by only one amplifier at an end-terminal. Such a configuration exploits the advantage of simple repeaters without inline DCFs. In addition, one DCF can be used to provide bulk compensation for all channels in a multiplexed transmission signal because the residual dispersion is compensated in the electrical domain.

FIG. 2 is a diagram of a transmission system 20 according to the prior art, without coherent detection, comprising a start terminal 21, an end terminal 22, and an optical link 23 therebetween. A plurality of input channels at different wavelengths 211a-n feed into the start terminal 21 and are multiplexed into a single optical signal that is launched into optical link 23. Optical link 23 comprises a plurality of lengths of a single-mode transmission fiber (SMF) 231a-n. Each length of SMF is paired with a corresponding length of a dispersion-compensating fiber (DCF) 232a-n. The DCF is part of an amplifier 233a-n that is provided between each length of SMF. To reduce the need for per-channel dispersion compensation, each DCF 232a-n preferably provides compensation for both dispersion and dispersion slope.

At end terminal 22, the optical signal is demultiplexed into separate output channels 222a-n corresponding to input channels 222a-n. Each output channel can optionally be provided with a respective dispersion-compensating module DCM1-DCMn for providing residual dispersion compensation, if necessary. The inline dispersion compensation at every amplifier is preferred for several reasons. A currently known DCM includes both dispersion and dispersion slope compensations as well as low PMD, but has very high insertion loss such that the full dispersion compensation can be done at the terminal only. Additionally, current transmission systems that do not use coherent detection require that the accumulated dispersion is kept low.

FIG. 3 is a diagram of a transmission system 30 according to an exemplary practice of the present invention. System 30 comprises a start terminal 31, an end receiving terminal 32, and an optical link 33 therebetween. A plurality of input channels at different wavelengths 311a-n feed into the start terminal 31 and are multiplexed into a single optical signal that is launched into optical link 33. Optical link 33 comprises a plurality of lengths of a single-mode transmission fiber (SMF) 331a-n. An amplifier 333a-n is provided between each length of SMF. Bulk dispersion compensation are provided by a single dispersion-compensating system DCM 322 of the type shown in FIG. 1 (bulk DCM 11). DCM 321 is located at the end terminal 32, prior to the demultiplexing of the transmitted signal into individual channels 321a-n. Residual dispersion compensation is done after demultiplexing of the individual wavelength channels by digital domain residual dispersion-compensating modules (DDR/DCMs) 323a-n of the type shown in FIG. 1 (residual DCM 12).

Alternatively, instead of implementing the bulk DCM 11 as part of the receiver as described above, the bulk DCM 11 could be a part of the input terminal 31, while the residual electrical domain dispersion compensation (DCM 12) is still performed after demultiplexing at the receiver. As a further alternative, the bulk DCM 11 could be split into two parts, one at the input terminal 31 and one at the output terminal 32.

It will be appreciated that by using a system of the type shown in FIG. 3, in which bulk dispersion compensation is provided by DCM 322, it is possible to achieve significant savings compared with a comparable system in which all dispersion compensation is performed in the electrical domain.

2. Theoretical Framework

There is now provided a theoretical framework for a dispersion-compensating fiber (DCF) suitable for use in providing bulk terminal compensation in the optical domain in a coherent detection transmission system. The requirements for such a DCF are different from the requirements of a typical inline DCF. Dispersion slope compensation is not needed. In addition, higher PMD can be tolerated as the residual dispersion and PMD can easily be compensated for by the DSP in the residual DCM. However, on the other hand, the requirement for low loss assumes added importance. The number of modules is dictated by the amount of loss that can be compensated by an erbium-doped fiber amplifier (EDFA) or like device (i.e., approximately 10-20 dB). If the loss introduced by a given DCM exceeds this amount, additional components will be required.

The total loss of a DCF module, $\alpha_M$, can be expressed as stated in Equation (1):

$$\alpha_M = \frac{|D_{tot}|}{FOM} + \alpha_D, \qquad \text{Eq. (1)}$$

where $D_{tot}$ is the total dispersion of the module, $\alpha_D$ is the sum of discrete losses, typically splice and connector losses.

As discussed previously, a "figure of merit" (FOM) is a quantity used to characterize the performance of a device, system or method, relative to its alternatives. The FOM for a DCF is defined herein by Equation (2):

$$FOM = -\frac{D_{DCF}}{\alpha_{DCF}}, \qquad \text{Eq. (2)}$$

where $D_{DCF}$ is the dispersion coefficient, and $\alpha_{DCF}$ is the attenuation coefficient of the DCF.

The highest FOM reported so far for a DCF is approximately 480 ps/(n·dB). A DCF has been reported having a numerically large dispersion coefficient of −1800 ps/(nm·km) in a few-moded design utilizing the $LP_{01}$ mode. However, these reports have not reported an exact measurement of the attenuation coefficient and have not provided an evaluation of multipath interference (MPI).

As described below, according to various aspects of the invention described herein, it has been possible to achieve a dispersion-compensating fiber with an FOM of greater than 2000 ps/(nm·dB), 3. Exemplary DCF Accordingly, there is now described a DCF according to an aspect of the present invention suitable for use for bulk terminal compensation.

The described DCF employs a "few-moded" fiber design utilizing the $LP_{02}$ mode. Generally speaking, a "few-moded fiber" (FMF) is an optical fiber having a core diameter less than that of a multimode fiber, but greater than that of a single-mode fiber, such that only a few modes can be guided in the fiber core.

Compared to a single-mode design, a few-moded fiber design allows for greater design flexibility. Furthermore, a preferred higher order mode, such as the $LP_{02}$ mode, is used as the propagation mode instead of the fundamental $LP_{01}$ mode, which enables a higher dispersion coefficient and a larger effective area. Larger effective area is preferable as this allows for higher input power to the DCF. The described DCF design is capable of operation in the $LP_{02}$ mode with a figure of merit of 2200 ps/(nm·dB), having an effective area of 90 μm$^2$, and MPI of −37 dB. As described below, mode converters on the input and output of this DCF are used to convert between the $LP_{02}$ mode and the $LP_{01}$ mode of the connecting fibers.

Figure 4:
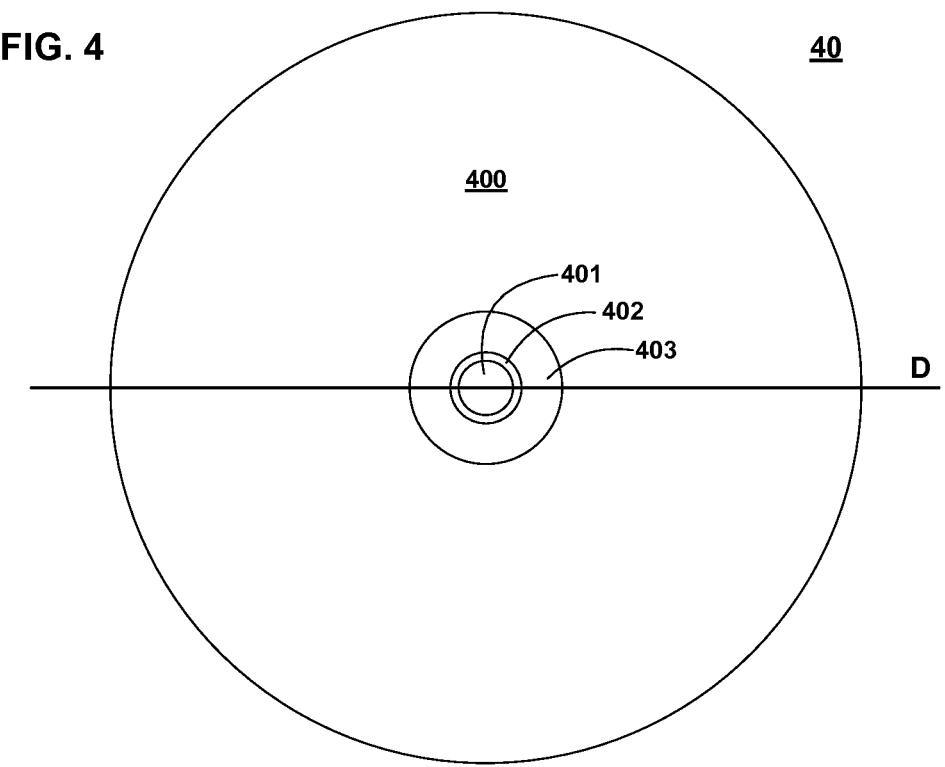
FIG. 4 shows a cross section of a dispersion-compensating fiber (DCF) according to a practice of the invention.
Figure 5:
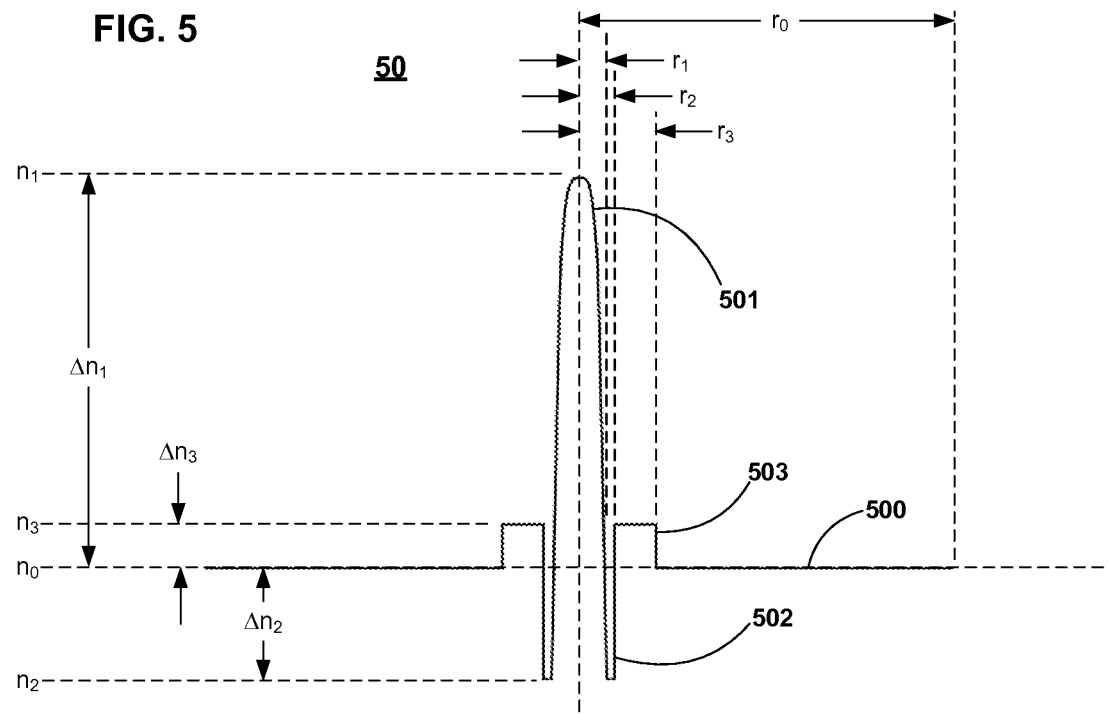
FIG. 5 shows a refractive index profile for the DCF.

FIG. 4 shows a cross section of a DCF 40 according to a practice of the invention, and FIG. 5 shows a refractive index profile 50 across diameter D of DCF 40. DCF 40 is fabricated from a suitable light-transmitting material, such as silica ($SiO_2$) or the like, and is doped to create the following plurality of regions characterized by their respective refractive indices (referring to both FIGS. 4 and 5):

a pure silica outer cladding 400, 500, having an outer radius $r_0$, a refractive index $n_0$, and a refractive index difference $\Delta n_0 = n_0 - n_0 = 0$;

an up-doped core region 401, 501, having an outer radius $r_1$, a refractive index $n_1$, and a positive refractive index difference $\Delta n_1 = n_1 - n_0$;

a down-doped trench 402, 502, having an outer radius $r_2$, a refractive index $n_2$, and a negative refractive index difference $\Delta n_e = n_2 - n_0$; and an up-doped ring 403, 503, having an outer radius $r_3$, a refractive index $n_3$, and a positive refractive index difference $\Delta n_3 = n_3 - n_0$.

Figures 5A, 6:
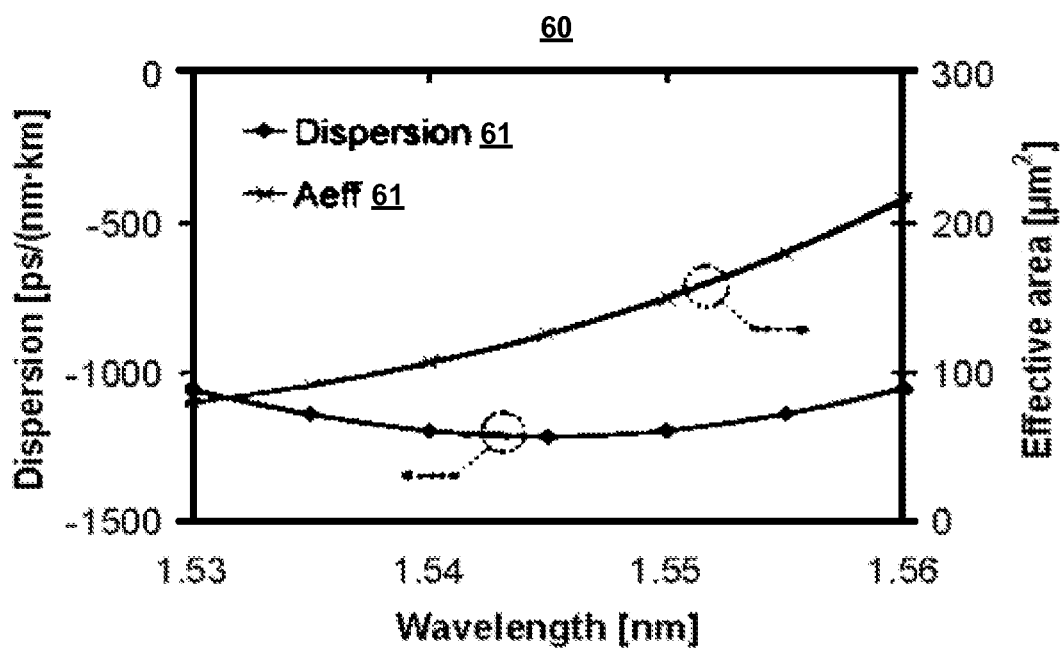
FIG. 5A shows a table setting forth fiber region radii and index differences in an exemplary practice of the invention.
FIG. 6 shows a graph illustrating the target dispersion and target effective area $A_{eff}$ in the C-band for the DCF.

FIG. 5A shows a table 51 setting forth exemplary radii and index differences $\Delta n$ for the core and cladding regions of DCF 40.

As shown in table 51:

the core region 401 has an outer radius $r_1 = 4.5$ μm, and an index difference $\Delta n_1 = 35 \times 10^{-3}$;

the trench 402 has an inner radius $r_1 = 4.5$ μm; an outer radius $r^2 = 6.1$ μm; and an index difference $\Delta n_2 = -10 \times 10^{-3}$;

the ring 403 has an inner radius $r_2 = 6.1$; and outer radius μm $r_3 = 13.0$ μm; and an index difference $\Delta n_3 = 4 \times 10^{-3}$; and the outer clad 400 has an inner radius $r_3 = 13.0$; an outer radius μm $r_4 = 62.5$ μm; and an index difference $\Delta n_0 = 0$.

In the presently described example of the invention, DCF 40 was drawn from a preform manufactured by a modified chemical vapor deposition (MCVD) technique. The core 401, 501 and ring 403, 503 are doped with a suitable index-raising dopant, such as germanium oxide ($GeO_2$), or the like. The trench 402, 502 is doped with a suitable index-lowering dopant, such as fluorine (F) or the like. It will be appreciated that it would be possible to practice aspects of the invention using other techniques and materials.

The DCF design illustrated in FIGS. 4 and 5 balances a number of different requirements, including the following:

(1) the dispersion coefficient should be as negative as possible without too much variation over the C-band;

(2) the attenuation coefficient should be as low as possible;

(3) the propagation constant of the preferred propagation mode should be sufficiently different from the propagation constant of other guided modes to suppress mode coupling;

(4) the bend-loss sensitivity of the preferred propagation mode should be low; and (5) to facilitate fabrication of broadband mode converters based on long-period gratings (LPG), the phase matching curve should have a turnaround point in the operating wavelength range.

It should be noted that if other mode converters and mode conversion techniques are used, item (5) may not be necessary. Mode conversion could be provided, for example, through the use of phase plates, spatial light modulators, or the like.

The above requirements have all been taken into account in arriving at the design for DCF 40. FIG. 6 shows a graph 60 illustrating the target dispersion (curve 61) and target effective area $A_{eff}$ (curve 62) in the C-band for DCF 40.

4. Exemplary Bulk Dispersion-Compensating Module

Figure 7:
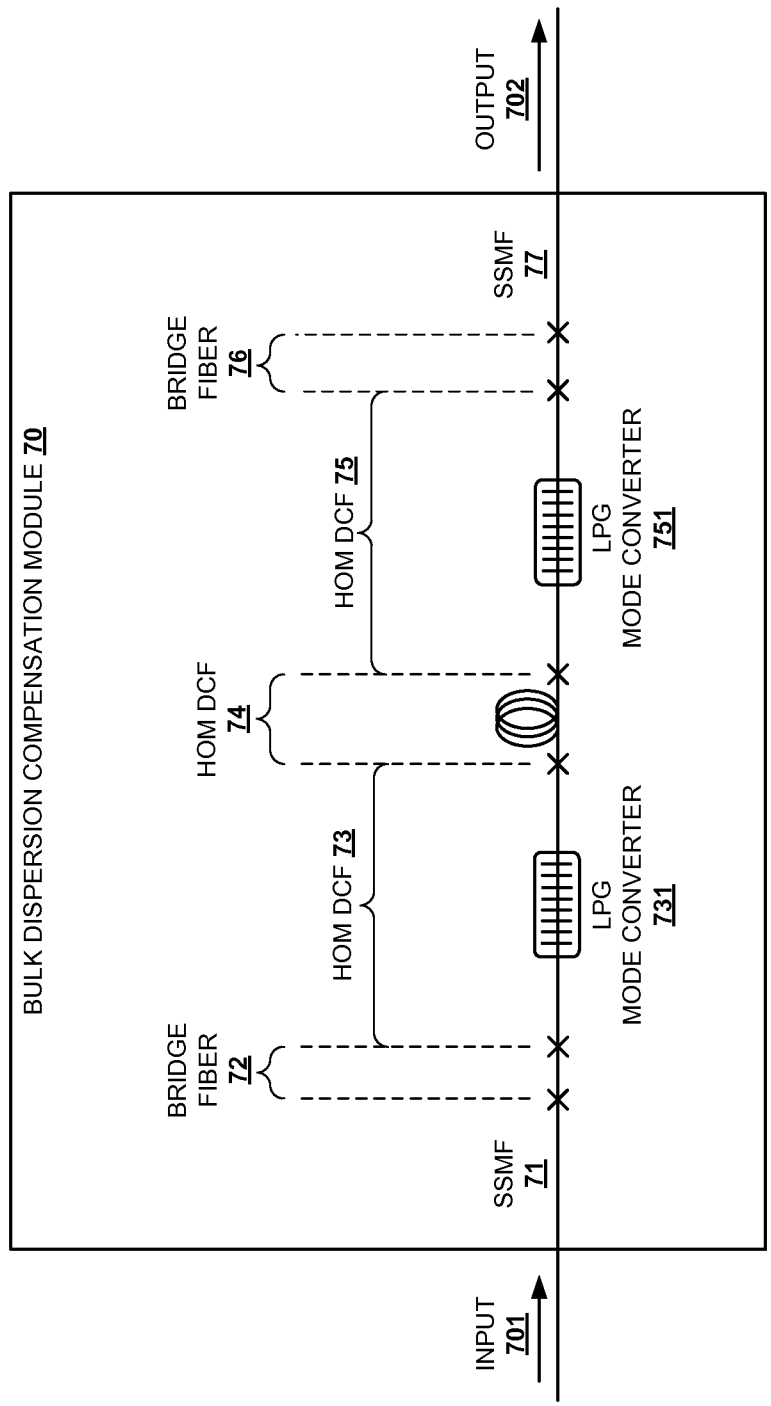
FIG. 7 shows a diagram illustrating an exemplary configuration of a bulk dispersion-compensating module, in accordance with an aspect of the invention.

FIG. 7 shows a diagram illustrating an exemplary configuration of an assembled bulk dispersion-compensating module (DCM) 70, in accordance with an aspect of the invention. Bulk DCM 70 provides bulk dispersion compensation, in the optical domain, for an optical transmission input 701.

Bulk DCM 70 comprises the following components, connected in series, with the X's representing splices between neighboring components:

an input fiber, comprising a first length of a standard single mode fiber 71;

an input bridge fiber 72;

an input mode converter, comprising a first length of a higher-order mode DCF 73, of the type described hereinabove, into which there has been written a first long-period grating (LPG) 731;

a bulk dispersion-compensating fiber, comprising a second length of a higher-order mode DCF 74, of the type described hereinabove, wherein the fiber length is configured to have a dispersion opposite that of the intended transmission fiber;

an output mode converter, comprising a third length of a higher-order mode DCF 75, into which there has been written a second LPG 751;

an output bridge fiber 76; and optionally an output fiber, comprising a second length of a standard single-mode fiber 77.

Generally speaking, it is preferable for HOM DCF 74 to be the same as, or close to, HOM DCFs 73 and 75, in order to minimize splice loss and MPI at the splice between HOM DCF 73 and HOM DCF 74, and at the splice between HOM DCF 74 and HOM DCF 75.

LPGs 731 and 751 were constructed by UV-exposure of DCF 40 through an amplitude mask. Strong gratings were obtained with coupling efficiency higher than 99% between $LP_{01}$ and $LP_{02}$ in a 16 nm bandwidth centered at 1540 nm.

Input and output bridge fibers 72, 76 each have a length of approximately two meters, and are used, respectively, to splice the SSMF input and output fibers fiber 71, 77 to HOM DCF 73, 75. Input and output bridge fibers 72, 76 each have a modefield diameter matching the $LP_{01}$ mode of the HOM fiber.

As discussed above, the FOM for a bulk dispersion-compensating module at a given wavelength is the ratio between the dispersion and the attenuation at that wavelength. Thus, bulk DCM 70 was subjected to a number of tests in order to measure splice loss (FIG. 8), insertion loss (FIG. 9), dispersion (FIG. 10), and MPI (FIG. 11). In addition, the combined overall attenuation of bulk DCM 70 was measured using an optical time-domain reflectometer (OTDR). The results of these measurements, at 1550 nm, are set forth in FIG. 12, in table 120.

Figures 8, 9:
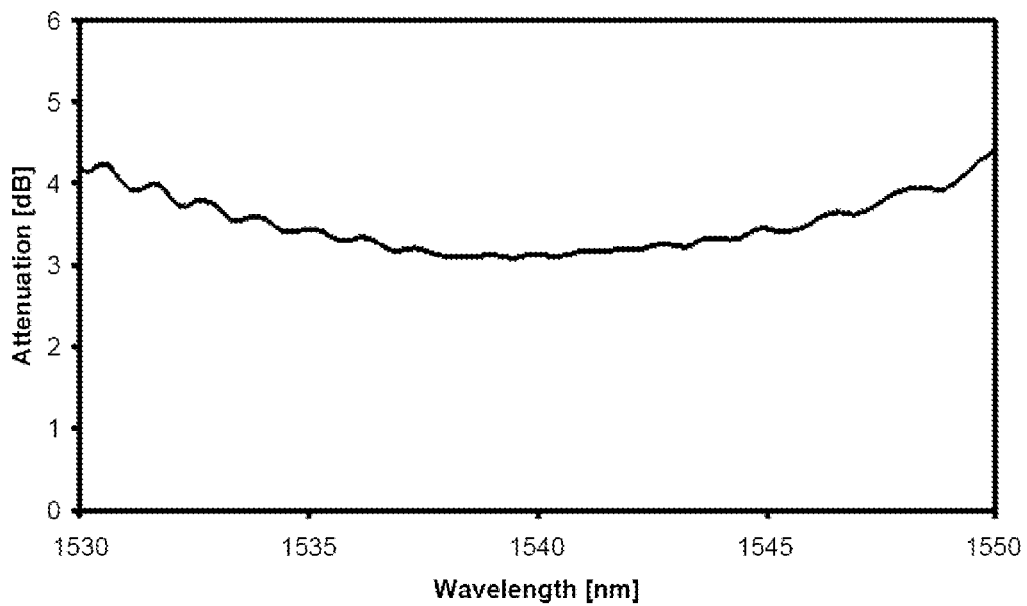
FIG. 8 shows a table setting forth the splice losses in the module.
FIG. 9 is a graph showing the measured insertion loss for the module.

FIG. 8 shows a table 80 setting forth the splice losses in module 70 (FIG. 7) obtained (1) between SSMF 71, 77 and bridge fiber 72, 76; (2) between bridge fiber 72, 76 and HOM DCF 73, 75; and (3) between HOM DCF 73, 75 and HOM DCF 74. As a coupling efficiency of greater than 99% corresponds to a loss of less than 0.04 dB, a total discrete loss of 1.9 dB is obtained.

FIG. 9 is a graph 90 showing the measured insertion loss (trace 91) for the assembled module with 2.1 km of HOM DCF fiber. At 1540 nm, an insertion loss of 3.1 dB was measured; at 1550 nm, an insertion loss of 4.4 dB was measured. The fiber attenuation was measured with an optical time domain reflectometer (OTDR) to 0.58 dB/km at 1550 nm.

Figure 10:
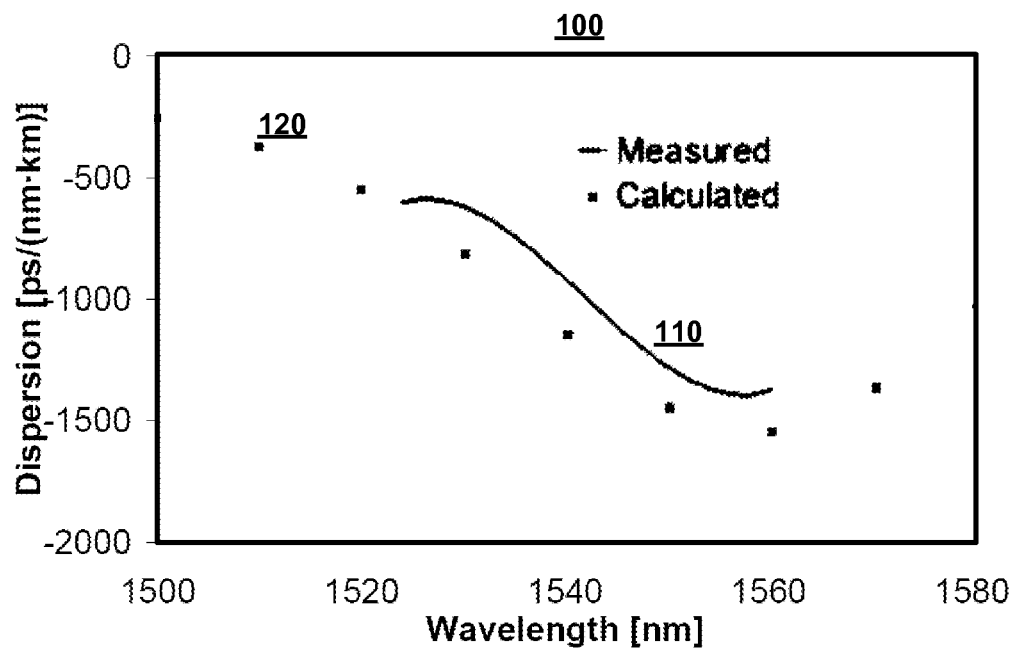
FIG. 10 is a graph showing measured dispersion for the module.
Figure 11:
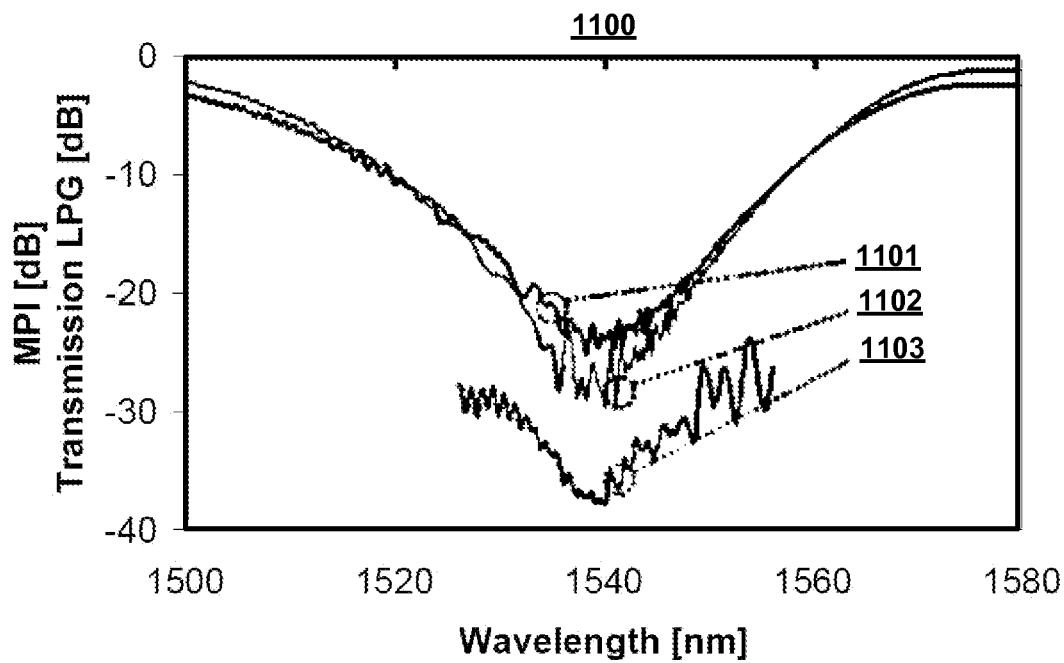
FIG. 11 is a graph showing measured multipath interference (MPI) for the module.

FIG. 10 is a graph 100 showing measured dispersion (curve 110) for the 2.1 km module 70 shown in FIG. 6. Dispersion calculated from the refractive index profile measured on the preform is also shown for reference (dots 120). It is observed that there is relatively good agreement between measured dispersion and simulations from the preform profile. However, compared to the target dispersion curve (plot 61) in FIG. 6, the dispersion curve 110 is a little shifted to a longer wavelength and a little deeper. As a consequence the variation in dispersion over the C-band is increased. This can be corrected with small adjustments of the preform profile.

FIG. 11 is a graph 110 showing measured multipath interference (MPI) (trace 1103) for the module. The transmission spectra of the LPG 731 and LPG 751 used in the mode converters (in FIG. 7) are also shown for reference (traces 1101, 1102). MPI is measured by transmitting the light from a tunable external cavity laser with a specified line width of 150 kHz through the module and measuring the fluctuation in the received power when the laser is stepped in increments of 0.01 nm. MPI can then be calculated from the following Equation (3):

$$MPI = 10\log\left(\frac{\sigma^2}{P_{avg}^2}\right), \quad \text{Eq. (3)}$$

where σ is the standard deviation of the received power calculated over a 2 nm scanning window and $P_{avg}$ is the average power over the scanning 2 nm window. The transmission spectra of the LPGs are the transmissions from $LP_{01}$ at the input to $LP_{01}$ at the output.

FIG. 12 shows a table 120 setting forth a summary of the test results. The FOM at 1550 nm was calculated to be approximately 2200, i.e., the absolute value of the ratio between −1275 (the dispersion at 1550 nm) and 0.58 (the attenuation at 1550 nm, measured by OTDR).

It is further noted that, in table 120, the PMD was measured using the Jones Matrix method in the wavelength range 1535-1545 nm. The PMD is quite high even though care has been taken to reduce core non-circularity and spinning of the fiber has been used during draw. This is attributed to the very high waveguide dispersion, which leads to high PMD values even for very small non-circularities. However, it might be possible to reduce the PMD by further optimizing the processes.

5. Conclusion

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

The invention claimed is:

1. A dispersion-compensating system, comprising:
an up-doped core region;
a down-doped trench;
and up-doped ring; and
an outer cladding, wherein the dispersion-compensating fiber is configured to have an effective area of 90 μm² or greater, wherein the dispersion-compensating fiber is configured to have a high figure of merit, wherein the figure of merit (FOM) is defined by the equation $$FOM = -\frac{D_{DCF}}{\alpha_{DCF}},$$

wherein $D_{DCF}$ is the dispersion coefficient, and $\alpha_{DCF}$ is the attenuation coefficient of the dispersion-compensating fiber, and wherein the figure of merit is greater than 2000 ps/(nm·dB).

2. The dispersion-compensating fiber of claim 1, wherein the fiber is configured as a few-moded fiber.

3. The dispersion-compensating fiber of claim 1, wherein the fiber is configured for operation in a higher-order mode.

4. The dispersion-compensating fiber of claim 3, wherein the fiber is configured for operation in the $LP_{02}$ mode.

5. A dispersion-compensating module, comprising:
a length of the dispersion-compensating fiber of claim 1;
an input fiber coupled to an input of the dispersion-compensating fiber; and
and output fiber coupled out of an end of the dispersion-compensating fiber.

6. The dispersion-compensating module of claim 5, wherein the dispersion-compensating fiber is configured for operation in a higher-order mode; and
wherein the dispersion-compensating fiber further includes input and output mode converters for coupling the input and output fibers to the higher-order mode of the dispersion-compensating fiber.

7. The dispersion-compensating module of claim 6, wherein the input and output fibers each comprise lengths of a single-mode fiber.

8. The dispersion-compensating module of claim 6, wherein the dispersion-compensating fiber is configured for operation in the $LP_{02}$ mode.

9. The dispersion-compensating module of claim 6, wherein the input and output mode converters comprise long-period gratings written into respective lengths of higher-order mode dispersion-compensating fiber.

10. The dispersion-compensating module of claim 9, further comprising:
an input bridge fiber for connecting the input to the input mode converter; and
a output bridge fiber for connecting the output to the output mode converter.

11. The dispersion-compensating module of claim 10, wherein the input and output bridge fibers have respective modefield diameters equal to that of the fundamental mode of the dispersion-compensating fiber.

12. The dispersion-compensating fiber of claim 1, wherein:
the outer cladding has an outer radius $r_0$, a refractive index $n_0$, and an index difference $\Delta n_0=0$;
the up-doped core region has a radius $r_1$, a refractive index $n_1$, and an index difference $\Delta n_1 = n_1-n_0$;
the down-doped trench has an inner radius $r_1$, an outer radius $r_2$, a refractive index $n_2$, and an index difference $\Delta n_2 = n_2 - n_0$; and
the up-doped ring has an inner radius $r_2$, an outer radius $r_3$, a refractive index $n_3$, and an index difference $\Delta n_3 = n_3 - n_0$,
wherein the up-doped core region has an index difference $\Delta n_1$ greater than $30 \times 10^{-3}$.

13. The dispersion-compensating fiber of claim 12 wherein:
$r_1=4.5$ μm;
$r_2=6.1$ μm;
$r_3=13.0$ μm;
$r_0=62.5$ μm;
$\Delta n_1=35\times10^{-3}$;
$\Delta n_2=-10\times10^{-3}$;
$\Delta n_3=4\times10^{-3}$; and
$\Delta n_0=0$.

* * * * *